(12) United States Patent
Bachmann et al.

(10) Patent No.: US 9,851,033 B2
(45) Date of Patent: Dec. 26, 2017

(54) COMPONENT CONNECTOR FOR CONNECTING CYLINDRICAL COMPONENTS

(71) Applicant: Arnold Jäger Holding GmbH, Hannover (DE)

(72) Inventors: Hans-Peter Bachmann, Eisdorf (DE); Stefan Babel, Oberasbach (DE)

(73) Assignee: Arnold Jäger Holding GmbH, Hannover (DE)

( * ) Notice: Subject to any disclaimer, the term of this patent is extended or adjusted under 35 U.S.C. 154(b) by 314 days.

(21) Appl. No.: 14/468,155

(22) Filed: Aug. 25, 2014

(65) Prior Publication Data
US 2015/0159789 A1 Jun. 11, 2015

Related U.S. Application Data

(63) Continuation of application No. PCT/DE2013/100057, filed on Feb. 14, 2013.

(30) Foreign Application Priority Data

Feb. 25, 2012 (DE) .................... 10 2012 003 817

(51) Int. Cl.
*F16L 21/06* (2006.01)
*F16L 21/00* (2006.01)
(Continued)

(52) U.S. Cl.
CPC ............. *F16L 21/007* (2013.01); *F16L 21/06* (2013.01); *F16L 21/08* (2013.01); *F16L 37/101* (2013.01); *F16L 49/06* (2013.01)

(58) Field of Classification Search
USPC .......... 285/86, 322, 324, 314, 315, 243, 359
See application file for complete search history.

(56) References Cited

U.S. PATENT DOCUMENTS 807,595 A * 12/1905 Brewer ................. F16L 33/222
                                                285/243
1,477,440 A * 12/1923 Grier, Jr. ............. F16L 37/1215
                                                279/71
(Continued)

FOREIGN PATENT DOCUMENTS

| DE | 1 952 286 | 12/1966 |
|----|-----------|---------|
| DE | 2 145 831 | 3/1973 |

(Continued)

OTHER PUBLICATIONS

International Search Report for Patent Application No. PCT/DE2013/100057, dated Jul. 29, 2013, (6 pages).

*Primary Examiner* — Aaron Dunwoody
(74) *Attorney, Agent, or Firm* — Shlesinger, Arkwright & Garvey LLP

(57) ABSTRACT

Component connector for connecting cylindrical components includes an elastic sleeve which surrounds the components, the elastic sleeve can be braced, a radially deformable fixing sleeve is provided which encloses elastic sleeve. Elastic sleeve is braced via radial deformation of fixing sleeve in a perpendicular direction to a longitudinal axis of fixing sleeve, and at least one clamping ring is provided for radially deforming fixing sleeve. Fixing sleeve has a profiled outer wall and clamping ring has an oppositely profiled inner wall so clamping ring can be pushed concentrically onto fixing sleeve in an accurately fitting manner, during a relative rotation of clamping ring, placed in an accurately fitting manner, in a closing direction, the fixing sleeve can be deformed radially inwardly by the surface profiling; and, during a relative rotation of clamping ring counter to the closing direction, the surface profiling prevents any rotation.

17 Claims, 7 Drawing Sheets

(51) Int. Cl.
*F16L 37/10* (2006.01)
*F16L 49/06* (2006.01)
*F16L 21/08* (2006.01)

(56) References Cited

U.S. PATENT DOCUMENTS

| | | | | |
|---|---|---|---|---|
| 4,632,437 A * | 12/1986 | Robson | ............... | F16L 37/101 285/243 |
| 4,857,706 A * | 8/1989 | Diamond | ............... | D06F 75/30 219/245 |
| 5,275,447 A * | 1/1994 | McNab | ............... | F16L 33/223 285/148.23 |
| 6,179,346 B1 * | 1/2001 | Robson | ............... | F16L 37/101 285/314 |
| 6,494,502 B1 * | 12/2002 | Plante | ............... | F16L 37/101 285/280 |
| 7,543,858 B1 * | 6/2009 | Wang | ............... | F16L 37/0982 285/314 |
| 7,699,357 B2 * | 4/2010 | Monsen | ............... | F16L 19/0653 285/243 |
| 8,550,742 B2 * | 10/2013 | Leroyer | ............... | H01R 13/623 403/342 |
| 8,888,143 B2 * | 11/2014 | Fog | ............... | F16L 19/025 285/309 |
| 9,283,344 B2 * | 3/2016 | Sheffer | ............... | A61M 16/0816 |
| 2002/0043804 A1 * | 4/2002 | Shen | ............... | F16L 19/075 285/322 |
| 2006/0237965 A1 * | 10/2006 | Corona | ............... | H01R 13/5205 285/322 |

FOREIGN PATENT DOCUMENTS

| | | |
|---|---|---|
| DE | 28 09 108 A1 | 9/1979 |
| DE | 299 08 172 U1 | 9/1999 |
| EP | 1 217 285 B1 | 2/2005 |

* cited by examiner

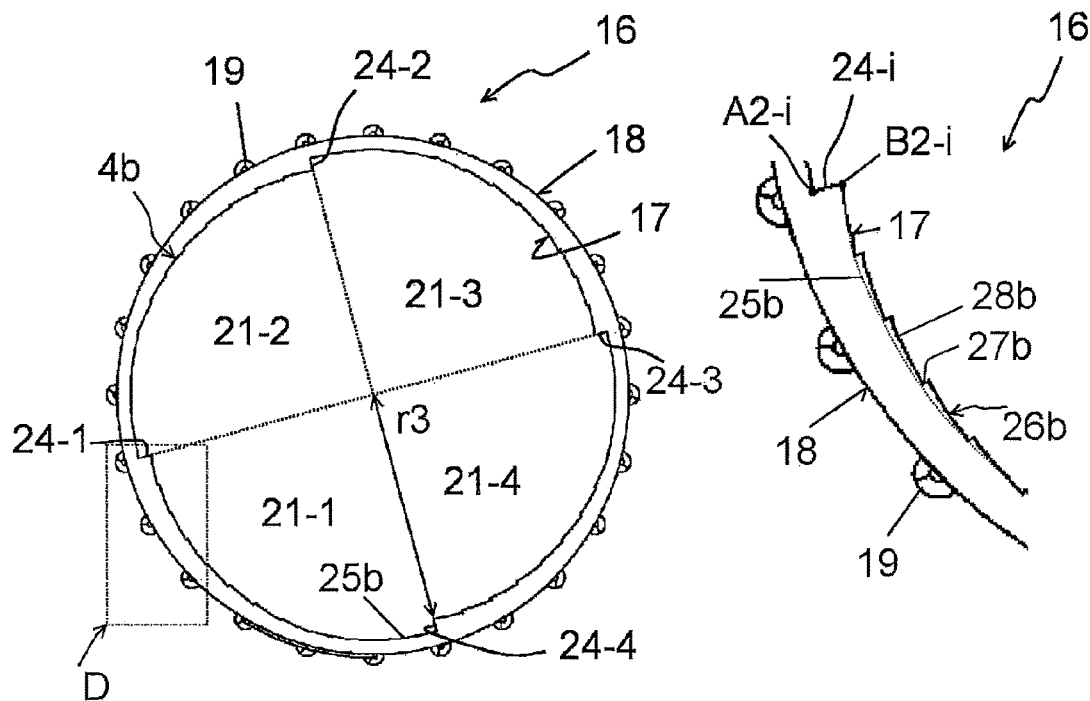
Fig. 6     Fig. 6a
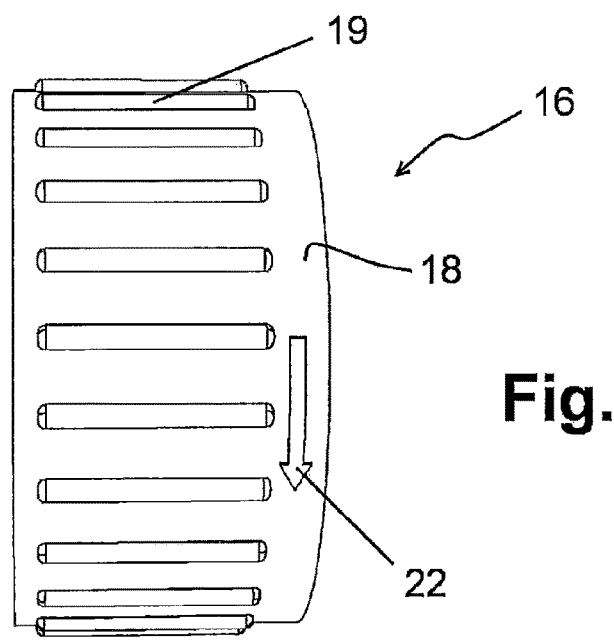
Fig. 7

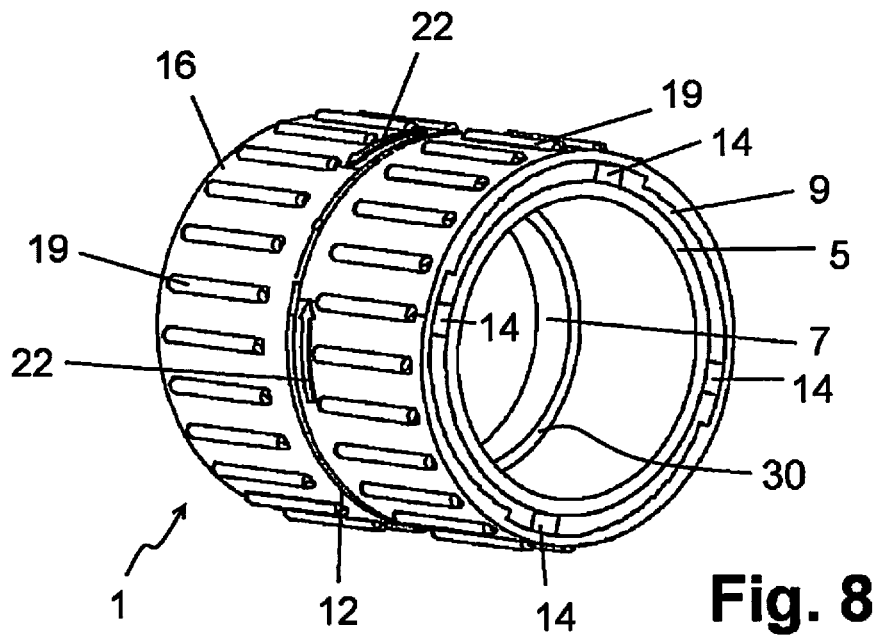
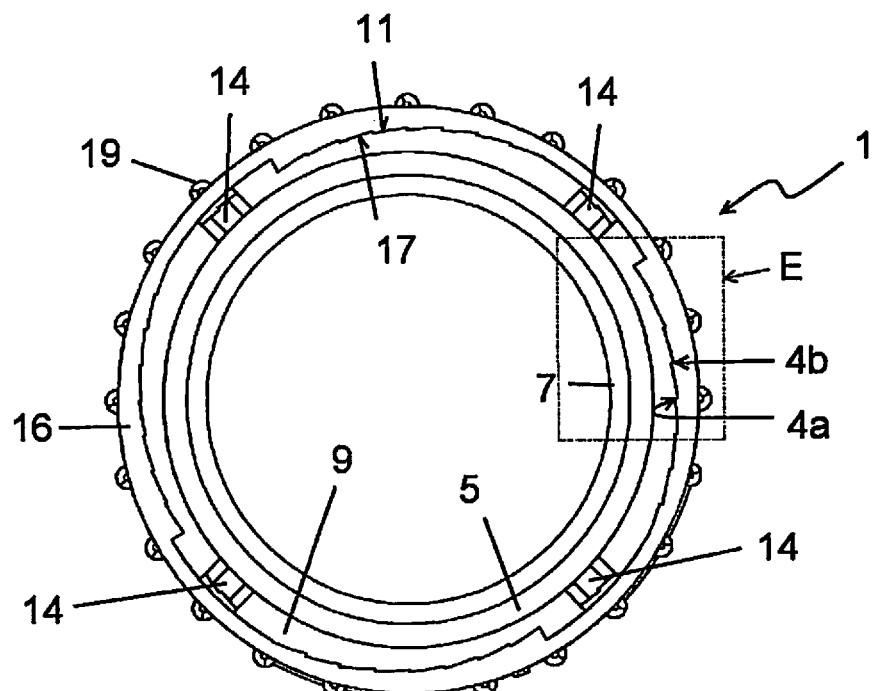

COMPONENT CONNECTOR FOR CONNECTING CYLINDRICAL COMPONENTS

CROSS REFERENCE TO RELATED APPLICATIONS

This application is a continuation of application No. PCT/DE2013/100057, filed 14 Feb. 2013, which claims the priority of German Application No. DE 10 2012 003 817.8, filed 25 Feb. 2012, and each of which is incorporated herein by reference.

FIELD OF THE INVENTION

The invention relates to a component connector for connecting cylindrical components. More particularly, the invention relates to a component connector for connecting cylindrical components, in particular pipes, and even more particularly, pipes for carrying fluids, such as gases or liquids.

BACKGROUND OF THE INVENTION

Component connectors or pipe connectors are already known from the prior art. They are used to fixedly connect two pipes in which a gas or a liquid, for example, may be conducted, so that the gas or the liquid may flow through the connected pipes.

To this end, an arrangement for producing extended channels is provided in Utility Model DE 299 08 172 U1, in which two components to be connected abut at their end faces and are fixed in a central location. Initially the end faces are joined so that they seal the gap, using a bonding agent. An adhesive which cures under the influence of heat is used as the bonding agent. After the curing, the connecting point is uniformly covered with a fixing casing on both sides, thus axially and radially fixing the components to one another in a precise manner.

In addition, Published Unexamined German Patent Application 2 145 831 discloses a pipe connection for two pipes made of thermoplastic plastic which are placed against one another at their end-faces. For this purpose, a sleeve made of a thermoplastic or thermoelastic plastic band is provided which is wound onto the pipe ends in the area of a butt seam and stretched onto the pipes via shrinkage forces. For sealing, in addition a sealing ring is provided which is likewise secured and stretched by the sleeve.

In these approaches, it is disadvantageous that the connections are very difficult to reopen. On the one hand, stretched casings made of thermoplastic or thermoelastic plastic, for example, are removable only with effort, and on the other hand, a cured adhesive on the end faces is not easy to detach without also damaging the connected components.

Furthermore, the casing is easily accessible from the outside, and may thus be damaged not only in the stretched state, but also during attachment. Damage to the casings has an effect primarily on the seal-tightness and the reliability of the connection. As a result, leakage of a liquid or escape of a gas as well as shifting of the pipes are not reliably preventable. Therefore, rapid opening and closing of the component connection as well as frequent use of the same component connector or component cannot be ensured.

U.S. Pat. No. 4,632,437 discloses a pipe connector in which a fixing sleeve is provided on which projections are situated. The projections are an integral part of the fixing sleeve, and surface profiling in the form of detent elements is provided on the projections. In addition, a cylindrical gripping ring is provided which encloses the fixing sleeve with the projections, and the inner wall of the gripping ring likewise has surface profiling, so that the gripping ring may be concentrically pushed onto the projections of the fixing sleeve in a precisely fitting manner. As the result of rotating the gripping ring, the fixing sleeve is compressed, and teeth situated thereon are thus pressed into a component situated on the fixing sleeve, thus fixing the component. The components are sealed by additional O-rings which are provided between the component and the pipe connector. Such a fixing sleeve and such a gripping ring are situated on both sides of the pipe connector, so that two components may be joined together.

OBJECTS AND SUMMARY OF THE INVENTION

The object of the invention, therefore, is to provide a component connector, in particular for connecting pipes, which with few components allows a rapid, reliable connection and a sealing effect.

This object is achieved by the features of claim 1. The subclaims set forth advantageous further embodiments of the invention.

By use of the component connector according to the invention, a component connection is achieved due to the fact that end faces of the cylindrical components to be connected, preferably cylindrical components having the same diameter, are placed against one another and held in this position by a force fit between the component connector and the component. The cylindrical components are aligned with one another. However, the component connector may also be designed in such a way that components having different diameters may be connected at an angle with respect to one another.

According to the invention, the component connector has an elastic sleeve which encloses the components in an area of a butt seam. A butt seam is understood to mean a connecting point of the respective end faces of the cylindrical components which are placed against one another. The elastic sleeve covers a large enough area of the components that secure fixing and sealing of the butt seam is ensured.

According to the invention, in addition a fixing sleeve which encloses the elastic sleeve is provided. The fixing sleeve is deformable, in particular in the radial direction, i.e., in a direction perpendicular to its longitudinal axis. A radial deformation of the fixing sleeve likewise results in bracing of the elastic sleeve thereunder, since an inner wall of the fixing sleeve presses on an outer wall of the elastic sleeve.

This bracing of the elastic sleeve results in a force fit between the components and the elastic sleeve resting thereon. The components are thus fixed and also sealed, since above a certain level of bracing the elastic sleeve is pressed so strongly against the components that a fluid which is conducted in the components is not able to escape through the butt seam, and subsequently between the components and the elastic sleeve, to the surroundings.

At least one clamping ring is provided for bracing the fixing sleeve in the radial direction. This clamping ring likewise has a cylindrical design, and may be pushed onto the fixing sleeve in the direction of the longitudinal axis.

According to the invention, the clamping ring has surface profiling on its inner wall, and the fixing sleeve has surface profiling on its outer wall. The surface profiling of the fixing sleeve resembles that of the clamping ring, so that in a certain rotation relative to one another the profiled inner wall of the clamping ring contacts the profiled outer wall of the fixing sleeve, preferably over the entire circumference; the clamping ring may thus be pushed onto the fixing sleeve in a precisely fitting manner.

According to the invention, the surface profiling is also designed in such a way that rotating the pushed-on clamping ring relative to the fixing sleeve has the following effect:

When the clamping ring is rotated in a closing direction, the profiled inner wall of the clamping ring presses the profiled outer wall of the fixing sleeve radially inwardly. This is preferably achieved via an increasing or decreasing radius, i.e., by at least one wedge face in each case on the inner wall of the clamping ring and on the outer wall of the fixing sleeve.

A rotation of the clamping ring opposite to the closing direction is prevented by the surface profiling, and the clamping ring is blocked in this rotational direction. This is preferably achievable by a ratchet step profile on the wedge faces of the inner wall and the outer wall, the ratchet steps extending in such a way that end faces of the ratchet steps block one another only during rotation opposite to the closing direction.

The components are thus fixable in the closing direction by rotating the clamping ring, since the fixing sleeve is deformed in the process and the elastic sleeve is thus pressed against the components. As a result of the ratchet steps, when a closed position is reached the clamping ring is locked and the components are thus fixed. To release the fixing, the clamping ring is "overtightened" in the closing direction until the initial relative rotation is once again reached, and the two profiled walls rest on one another in a precisely fitting manner over the entire circumference. However, the fixing may also be released by pulling the clamping ring off the fixing sleeve in the axial direction in the braced state of the fixing sleeve, thus returning the fixing sleeve to its undeformed state.

This results in several advantages:

Rapid assembly is possible due to the design of the component connector according to the invention, since the components may be easily inserted into the opened component connector. In particular, components having different shapes may be connected to cylindrical end pieces, so that the connector is insertable in a very variable manner.

Rotating the clamping ring also allows very rapid and simple fixing of the components, which at the same time are aligned by the elastic sleeve during closing. Adhesives or heat treatment are not necessary for the sealing. The connection is also very easily releasable with no damage to the component connector or the components, thus keeping the level of effort and the costs low due to the fact that both components are reusable.

In addition, the fixing sleeve and the clamping ring protect the elastic sleeve, and thus the sealing portion of the connector, from damage from the outside. Externally acting forces always damage the robust components first, thus ensuring reliable fixing and sealing. Furthermore, in the event of damage to an individual part, it is not necessary to replace the entire component connector; rather, if the elastic sleeve, for example, is damaged, it is necessary only to replace this part. Savings in material costs are thus realized.

BRIEF DESCRIPTION OF THE DRAWINGS

The invention is explained in greater detail below with reference to embodiments. The figures show the following:

FIG. 6a shows a detail D according to FIG. 6 in an enlarged illustration, FIG. 7 a side view of the clamping ring of the component connector, FIG. 8 a perspective view of the component connector according to the invention in the assembled state, FIG. 8a a perspective view of the component connector according to the invention in the assembled state with two pipes shown in broken line, FIG. 9 an end view of the component connector according to the invention in the assembled state, and FIG. 9a a detail E according to FIG. 9 in an enlarged illustration.

DETAILED DESCRIPTION OF THE INVENTION

Figure 1:
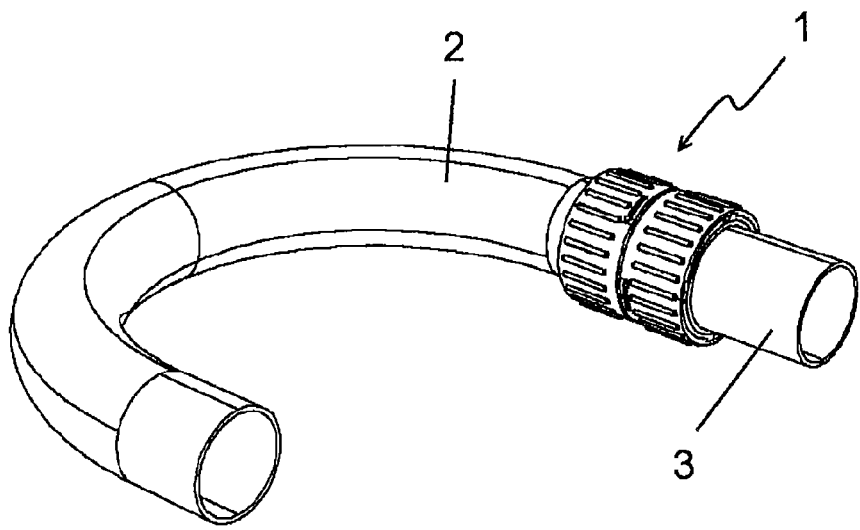
FIG. 1 two pipes which are connected by a component connector according to the invention, FIG. 2 a perspective view of an elastic sleeve of the component connector, FIG. 3 a perspective view of a fixing sleeve of the component connector, FIG. 4 an end view of the fixing sleeve in the viewing direction of arrows A and B according to FIG. 3, FIG. 4a a detail C according to FIG. 4 in an enlarged illustration, FIG. 5 a side view of the fixing sleeve of the component connector, FIG. 6 an end view of a clamping ring of the component connector.

FIG. 1 shows a perspective view of a component connector 1 which connects two pipes 2 and 3. Individual components of the component connector 1 are explained in greater detail below with reference to FIGS. 2 through 7.

Figure 2:
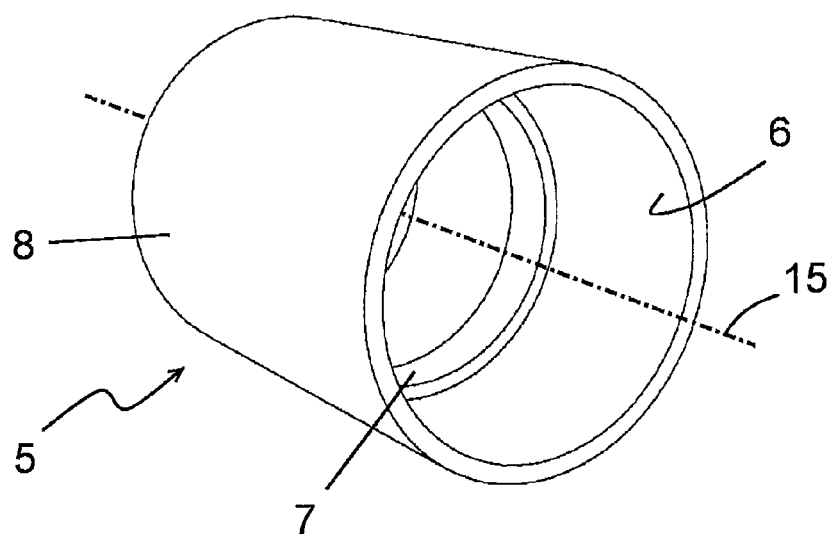

FIG. 2 shows an elastic sleeve 5 which forms an inner part of the component connector 1. The elastic sleeve 5 has a hollow cylindrical shape, in the installed state an inner wall 6 of the sleeve 5 resting on the pipes 2, 3 to be connected. The elastic sleeve 5 is preferably made of a plastic or an elastomer, by means of which the elastic sleeve 5 is deformable.

A circumferential web 7 which is situated approximately centrally is provided on the inner wall 6 of the elastic sleeve 5. The height of the web 7 corresponds approximately to the thickness of a wall of the pipes 2, 3 to be connected, so that the flow of a fluid which is conducted in the pipes 2, 3 is not hindered by the web 7. The web 7 may be a part of the elastic sleeve 5, but may also be adhesively bonded to the inner wall 6 of the elastic sleeve 5. In particular for the connection of glass tubes, the circumferential web 7 should prevent the end faces of the glass tubes from contacting one another, since this could result in unwanted damage to the end faces when the glass tubes move against one another. In addition, as a result of the web 7 the end faces of the pipes 2, 3 are also sealed, which improves the overall sealing.

Figure 3:
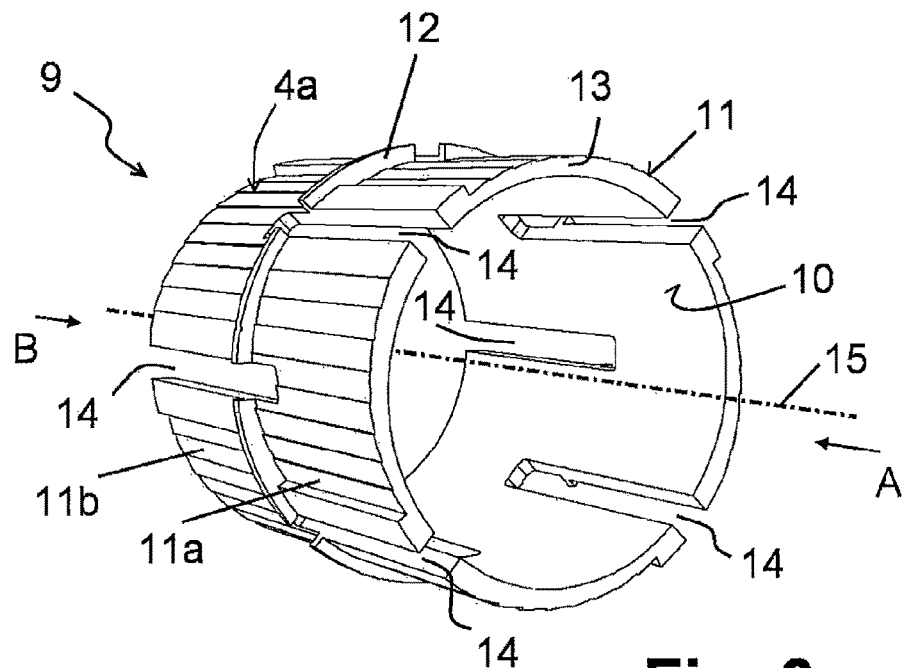
Figures 4, 4A:
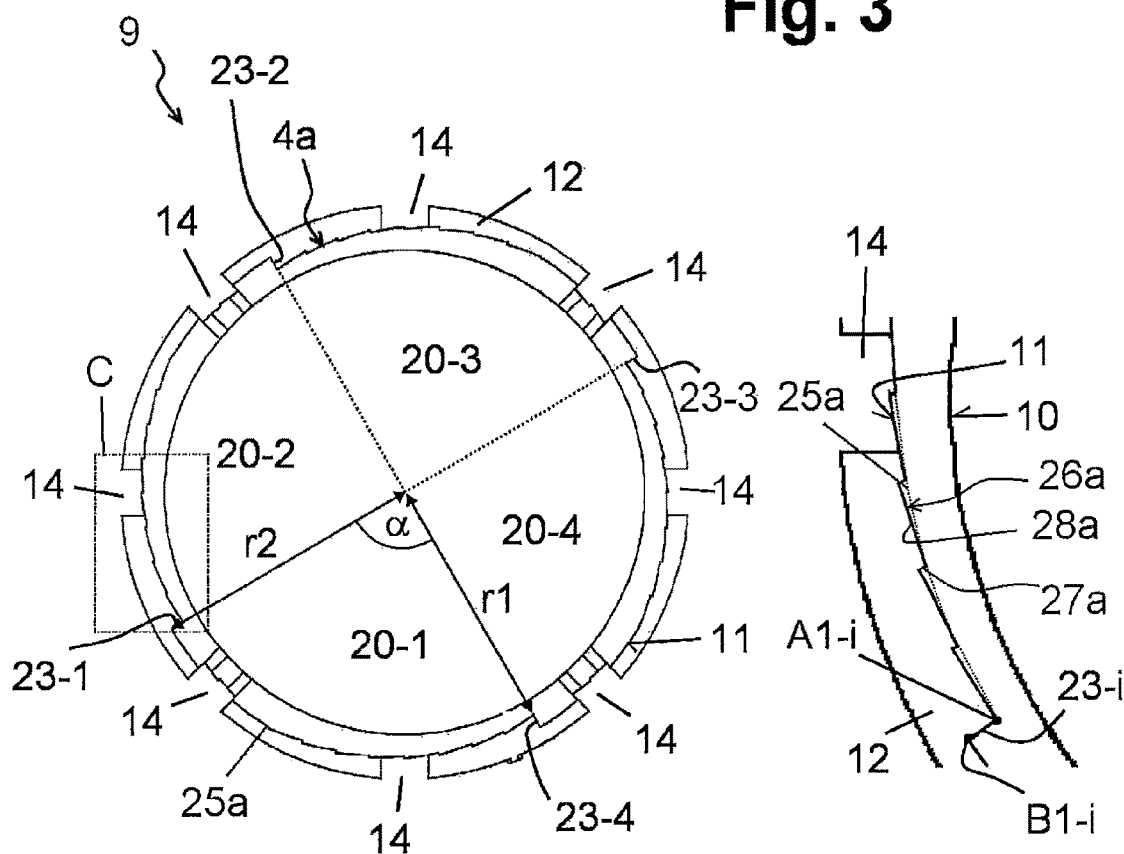
Figure 5:
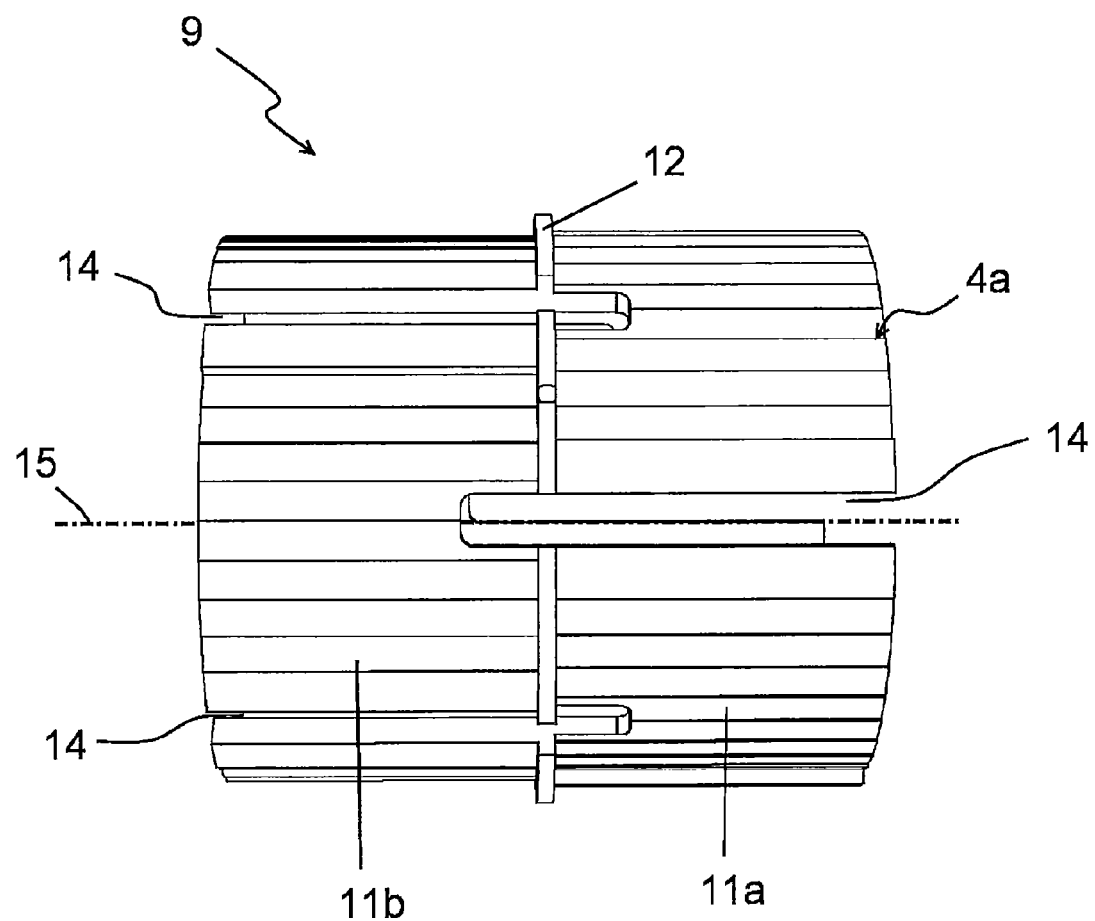

FIGS. 3 through 5 show a fixing sleeve 9 of the component connector 1. The fixing sleeve 9, the same as the elastic sleeve 5, has a hollow cylindrical design, and its smooth inner wall 10 may be pushed onto an outer wall 8 of the elastic sleeve 5 in a precisely fitting manner, both sleeves 5, 9 having the same length in the direction of their longitudinal axis 15. It may also be provided to produce the fixing sleeve 9 and the elastic sleeve 5 as a part in an injection molding process, for example.

Situated on an outer wall 11 of the fixing sleeve 9 is a circumferential web 12 which divides the outer wall 11 into two flat areas 11a, 11b of equal size. In addition, in this embodiment axial slots 14 are provided in a wall 13 of the fixing sleeve 9 which extend in alternation parallel to the longitudinal axis 15 of the fixing sleeve 9, starting from the two end faces of the fixing sleeve 9. As a result of these slots 14, the wall 13 of the fixing sleeve 9 is deformable at right angles to the direction of the longitudinal axis 15, i.e., radially inwardly. The slots 14 extend from the end faces to beyond the web 12, so that the web is omitted in the area of the slots 14, as the result of which the fixing sleeve 9 is also radially deformable in the area of the web 12. In particular, uniform radial deformability of the fixing sleeve 9 is ensured in this way.

According to the invention, the flat areas 11a, 11b of the outer wall 11 of the fixing sleeve 9 according to FIGS. 3 through 5 have surface profiling 4a, which is clearly apparent in particular in the end face view according to FIGS. 4 and 4a.

The surface profiling 4a is divided into four congruent segments 20-i, where i=1, 2, 3, 4, each segment encompassing an angular range of α=90°. A segment 20-i begins at a point A1-i with a starting radius r1 of the outer wall 11. The radius of the outer wall 11 subsequently increases uniformly in an angular range of 90° to an end radius r2 at a point B1-i, thus forming a wedge face 25a. In addition, ratchet steps 26a are situated at uniform intervals on the outer wall 11 between points A1-i and B1-i, the ratchet steps 26a having a steep flank 27a and a flat flank 28a. At point B1-i, the outer wall 11 drops back to the starting radius r1 in a larger step 23-i, and the next segment i+1 begins. Alternatively, more or fewer than four segments may be provided, as the result of which the angular range α of the segments changes to 360° divided by the number i of the segments.

As is also apparent in FIGS. 3 and 5, the flat areas 11a, 11b are profiled in opposite directions. The wedge faces 25a with the ratchet steps 26a ascend in the first flat area 11a in a direction of rotation, whereas they descend in the second flat area 11b, in the same direction of rotation.

Another part of the component connector 1 is shown in FIGS. 6 and 7. The figures illustrate a clamping ring 16 in an end view and in a side view, respectively. The clamping ring 16, the same as all the other parts 5, 9 of the component connector 1, has a hollow cylindrical design. Two of these clamping rings 16 are provided for the component connector 1.

FIGS. 6 and 6a show that an inner wall 17 of the clamping ring 16 has profiling 4b:

Ratchet steps 26b having a steep flank 27b and a flat flank 28b are situated at uniform intervals on the inner wall 17 in four segments 21-i, where i=1, 2, 3, 4. At the same time, the radius r3 of the inner wall 17 according to FIGS. 6 and 6a decreases within the segments between point A2-i and point B2-i, thus forming a wedge face 25b. The magnitude of the inclination of the wedge face 25b of the clamping ring 16 is equal to the magnitude of the inclination of the wedge face 25a of the fixing sleeve 9. In a step 24-i the radius subsequently drops back to its starting height, and the next segment begins.

In addition, in this embodiment multiple gripping means 19 are situated on the outer wall 18 of the clamping ring 16 according to FIGS. 6 and 7. The gripping means allows reliable gripping and twisting even under special conditions, such as operation while wearing gloves, or when the hands or the clamping ring 16 are damp. In addition, twisting of the clamping ring 16 is simplified, and a larger force for twisting may be transmitted to the clamping ring 16. An arrow 22 on the outer wall 18 of the clamping ring 16 indicates its closing direction.

Figure 8A:
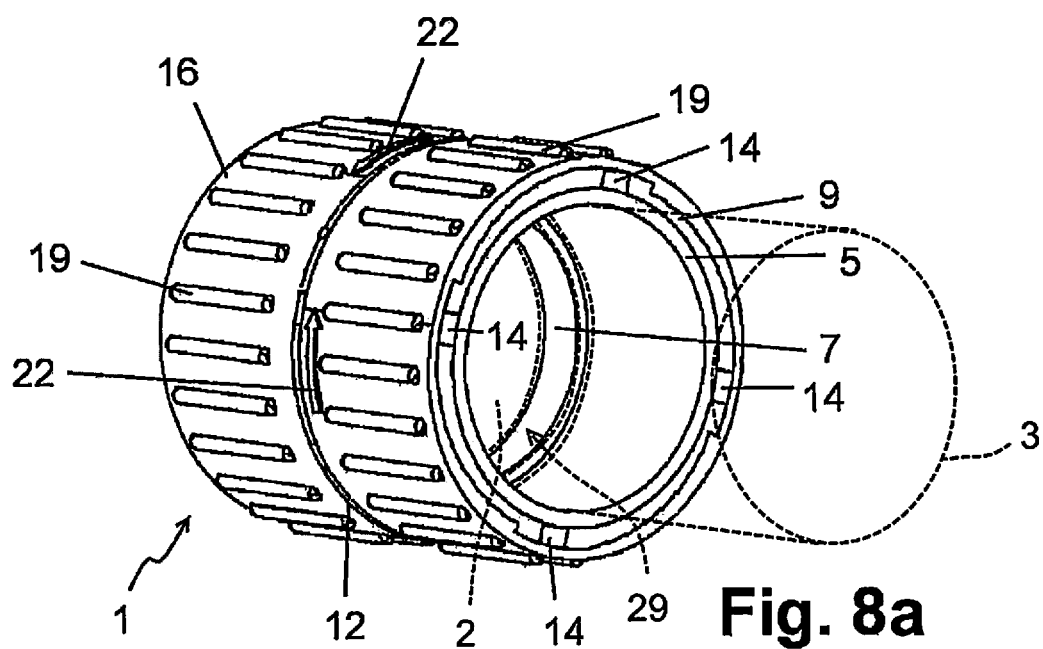

FIGS. 8 and 9 show the component connector 1, composed of the elastic sleeve 5, the fixing sleeve 9, and the two clamping rings 16, in the assembled state in a perspective view and an end view, respectively. The two clamping rings 16 are pushed from both sides onto the fixing sleeve 9, which is connected to the elastic sleeve 5 to form a component. The closing directions of the respective clamping rings 16 are in opposite directions.

Figure 9A:
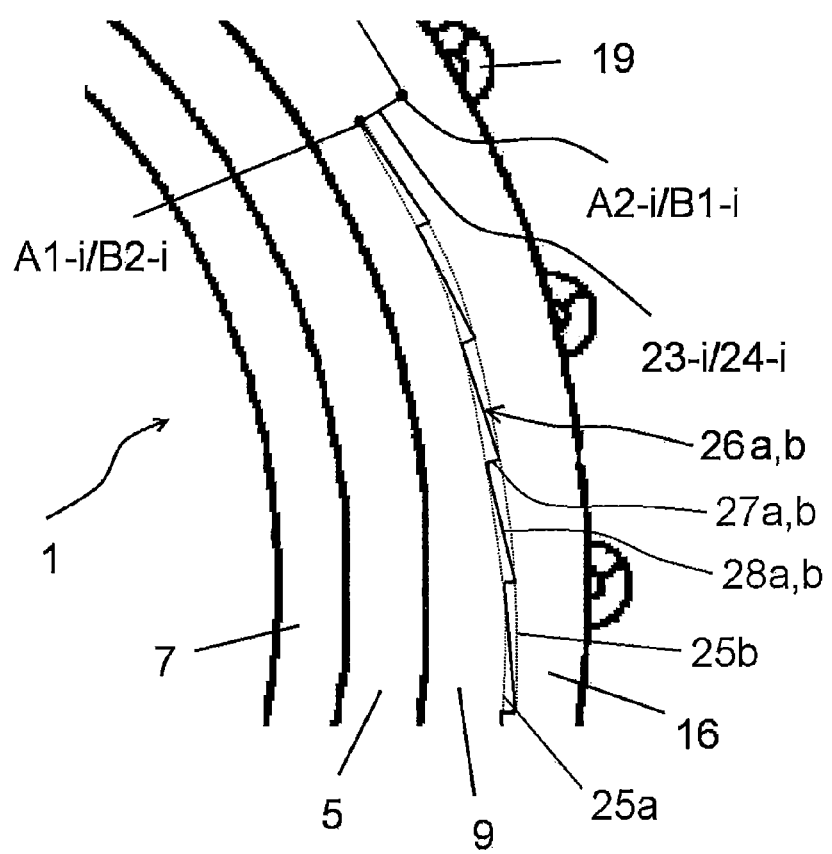

When the two clamping rings 16 are mounted, it is therefore important to ensure that the profiled inner wall 17 of the respective clamping ring 16 is set on the respectively oppositely profiled flat area 11a, 11b of the fixing sleeve 9 in a precisely fitting manner. This is the case when the respective clamping ring 16 is rotated relative to the flat area 11a, 11b of the fixing sleeve 9 in such a way that the end faces of the steps 23-i and 24-i make contact, and in addition the clamping rings 16 rest on the fixing sleeve 9 in such a way that the wedge faces 25a of the fixing sleeve 9 as well as the wedge faces 25b of the clamping rings 16 ascend in the same rotational direction. As shown in FIG. 9a, in this state the points A2-i coincide with the points B1-i, and at the same time, the points A1-i coincide with the points B2-i, and the flat flanks 28a, 28b rest on one another over the entire circumference.

For using the component connector 1, as shown in FIG. 1 the two pipes 2 and 3 are inserted into the assembled component connector 1 from both sides until the end faces of the pipes 2, 3 contact the web 7 and pipe 3 abuts end face 30 of web 7 (as labelled in FIG. 8) in the region of a butt seam 29 of web 7 (as labelled in FIG. 8a) in the elastic sleeve 5. The clamping rings 16 are subsequently rotated in their respective closing direction. Due to the opposite profiling 4a of the flat areas 11a, 11b, the closing directions of the respective clamping rings 16 are likewise opposite. Therefore, for closing the component connector 1 the two clamping rings 16 must be rotated in opposite directions, as indicated by the arrows 22 in FIG. 8. A butt seam is understood to mean a connecting point of the end faces of the cylindrical components which are placed against one another. The elastic sleeve covers a large enough area of the components that secure fixing and sealing of the butt seam is ensured.

The closing direction refers to the rotational direction in which the fixing sleeve 9 is deformed radially inwardly i.e., at right angles to the direction of the longitudinal axis 15, due to the rotation of the respective clamping ring 16, thus bracing the elastic sleeve 5 and pressing it against the pipes 2, 3. A deformation of the fixing sleeve 9 results when the clamping rings 16 are rotated on the fixing sleeve 9 in such a way that the profiled inner wall 17 of the clamping rings 16 presses against the profiled outer wall 11 of the fixing sleeve 9. As a result of the profiled walls 11, 17 being rotated against one another, the wedge faces 25b on the inner wall 17 of the clamping rings 16 contact with increasingly smaller radii the wedge faces 25a of the outer wall 11 of the fixing sleeve 9, whose radius at the same time is becoming increasingly larger. Since the clamping rings 16 are not radial outwardly deformable, a deformation of the fixing sleeve 9 results which is radial inwardly directed.

Due to the ratchet steps 26a, 26b in the surface profiling 4a, 4b, rotation opposite to the closing direction is blocked, since the steep flanks 27a of the ratchet steps 26a on the outer wall 11 of the fixing sleeve 9 press against the steep flanks 27b of the ratchet steps 26b on the inner wall 17 of the clamping ring 16, so that rotation is possible only with a very high counterforce, which at the same time would damage the surface profiling 4a, 4b. At the same time, the component connector is thus prevented from unintentionally coming loose on its own in the fixed and sealed state. Intentional loosening of the component connector 1 is achieved by "overtightening" the clamping rings 16. In the process, the clamping ring 16 is further turned in the closing direction until the starting position is once again reached, and the elastic sleeve is therefore no longer pressed against the pipes 2, 3; the pipes 2, 3 are thus no longer fixed and sealed, and may be removed from the component connector 1. In addition, the fixing may also be detached by pulling off the clamping rings 16 in the direction of the longitudinal axis 15 of the fixing sleeve 9 in the braced state of the fixing sleeve 9. As a result, the deformation of the fixing sleeve 9 is eliminated, and the elastic sleeve 5 no longer presses against the pipes 2, 3.

It can be seen that the invention relates to a component connector 1 for connecting cylindrical components 2,3, at least comprising an elastic sleeve 5 which surrounds the components 2, 3, wherein the elastic sleeve 5 can be braced, and a radially deformable fixing sleeve 9 is provided which encloses the elastic sleeve 5, wherein the elastic sleeve 5 is braced via a radial deformation of the fixing sleeve 9 in a perpendicular direction to a longitudinal axis 15 of the fixing sleeve 9, and furthermore at least one clamping ring 16 is provided for radially deforming the fixing sleeve 9, wherein the fixing sleeve 9 has a profiled outer wall 4a,11 and the clamping ring 16 has an oppositely profiled inner wall 4b,17 such that the clamping ring 16 can be pushed concentrically onto the fixing sleeve 9 in an accurately fitting manner, during a relative rotation of the clamping ring 16, placed in an accurately fitting manner, in a closing direction 22, the fixing sleeve 9 can be deformed radially inwardly by the surface profiling 4a,4b and, during a relative rotation of the clamping ring 16 counter to the closing direction 22, the surface profiling 4a,4b prevents any rotation.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

The invention claimed is:

1. Component connector for connecting cylindrical components comprising:
   a) a radially deformable fixing sleeve;
   b) a clamping ring for radially deforming the fixing sleeve;
   c) the fixing sleeve having a profiled outer wall and the clamping ring having an oppositely profiled inner wall in such a way that the clamping ring may be pushed concentrically onto the fixing sleeve in a precisely fitting manner;
   d) when the clamping ring, placed in a precisely fitting manner, undergoes a relative rotation in a closing direction, the fixing sleeve is radially inwardly deformable by the surface profiling, and when the clamping ring undergoes a relative rotation opposite to the closing direction, the surface profiling prevents rotation;
   e) an elastic sleeve being provided which surrounds the components in the area of a butt seam;
   f) a circumferential web is situated on the inner wall of the elastic sleeve in order to separate the end faces of the components to be connected; and
   g) the fixing sleeve enclosing the elastic sleeve, the elastic sleeve being braceable by a radial deformation of the fixing sleeve in a direction perpendicular to a longitudinal axis of the fixing sleeve for fixing and sealing off the butt seam, and thus, the components.

2. Component connector according to claim 1, wherein:
   a) the outer wall of the fixing sleeve has two flat areas, each of which extends away from the connecting point of the two components and which has surface profilings, oriented in opposite directions, in the form of at least two wedge faces oriented in the same direction in the peripheral direction;
   b) one clamping ring is associated with each flat area, the inner wall of the clamping ring having at least two wedge faces, oriented in the same direction in the direction of rotation, which have the same pitch as the wedge faces of the fixing sleeve, except that they are oriented in opposite directions; and
   c) the wedge faces are pushed onto one another when the clamping rings are rotated on the fixing sleeve in the closing direction, with radial pressure build-up on the associated flat areas, and the closed position which is attained is locked by ratchet steps provided on the wedge faces.

3. Component connector according to claim 2, wherein:
   a) the flat areas on the fixing sleeve are separated from one another by a circumferential web on the outer wall of the fixing sleeve.

4. Component connector according to claim 2, wherein:
   a) the respective clamping rings have oppositely directed closing directions due to the oppositely directed profiling of the flat areas.

5. Component connector according to claim 2, wherein:
   a) the surface profiling is divided into a number i of congruent segments, each segment encompassing an angular range of 360°/i, and only one wedge face being associated with each segment.

6. Component connector according to claim 1, wherein:
   a) slots are provided in a wall of the fixing sleeve, parallel to the longitudinal axis of the fixing sleeve to facilitate uniform radial deformation.

7. Component connector according to claim 1, wherein:
   a) the surface profiling is configured in such a way that the clamping rings may be placed on the fixing sleeve in a relative rotation which is free of counterforces.

8. Component connector according to claim 1, wherein:
   a) the fixing sleeve and the elastic sleeve are produced as a single component.

9. Component connector for connecting cylindrical components comprising:
   a) a radially deformable fixing sleeve;
   b) a clamping ring for radially deforming the fixing sleeve;
   c) the fixing sleeve having a profiled outer wall and the clamping ring having an oppositely profiled inner wall in such a way that the clamping ring may be pushed concentrically onto the fixing sleeve in a precisely fitting manner;
   d) when the clamping ring, placed in a precisely fitting manner, undergoes a relative rotation in a closing direction, the fixing sleeve is radially inwardly deformable by the surface profiling, and when the clamping ring undergoes a relative rotation opposite to the closing direction, the surface profiling prevents rotation;
   e) an elastic sleeve being provided which surrounds the components in the area of a butt seam;

f) the fixing sleeve enclosing the elastic sleeve, the elastic sleeve being braceable by a radial deformation of the fixing sleeve in a direction perpendicular to a longitudinal axis of the fixing sleeve for fixing and sealing off the butt seam, and thus, the components;

g) the outer wall of the fixing sleeve has two flat areas, each of which extending away from the connecting point of the two components and which has surface profilings, oriented in opposite directions, in the form of at least two wedge faces oriented in the same direction in the peripheral direction; and h) the flat areas on the fixing sleeve being separated from one another by a circumferential web on the outer wall of the fixing sleeve.

10. Component connector according to claim 9, wherein:
a) slots are provided in a wall of the fixing sleeve, parallel to the longitudinal axis of the fixing sleeve to facilitate uniform radial deformation.

11. Component connector for connecting cylindrical components comprising:
a) a radially deformable fixing sleeve;
b) slots are provided in a wall of the fixing sleeve, parallel to the longitudinal axis of the fixing sleeve to facilitate uniform radial deformation;
c) a clamping ring for radially deforming the fixing sleeve;
d) the fixing sleeve having a profiled outer wall and the clamping ring having an oppositely profiled inner wall in such a way that the clamping ring may be pushed concentrically onto the fixing sleeve in a precisely fitting manner;
e) when the clamping ring, placed in a precisely fitting manner, undergoes a relative rotation in a closing direction, the fixing sleeve is radially inwardly deformable by the surface profiling, and when the clamping ring undergoes a relative rotation opposite to the closing direction, the surface profiling prevents rotation;
f) an elastic sleeve being provided which surrounds the components in the area of a butt seam; and
g) the fixing sleeve enclosing the elastic sleeve, the elastic sleeve being braceable by a radial deformation of the fixing sleeve in a direction perpendicular to a longitudinal axis of the fixing sleeve for fixing and sealing off the butt seam, and thus, the components.

12. Component connector according to claim 11, wherein:
a) the outer wall of the fixing sleeve has two flat areas, each of which extends away from the connecting point of the two components and which has surface profilings, oriented in opposite directions, in the form of at least two wedge faces oriented in the same direction in the peripheral direction;
b) one clamping ring is associated with each flat area, the inner wall of the clamping ring having at least two wedge faces, oriented in the same direction in the direction of rotation, which have the same pitch as the wedge faces of the fixing sleeve, except that they are oriented in opposite directions; and
c) the wedge faces are pushed onto one another when the clamping rings are rotated on the fixing sleeve in the closing direction, with radial pressure build-up on the associated flat areas, and the closed position which is attained is locked by ratchet steps provided on the wedge faces.

13. Component connector according to claim 12, wherein:
a) the flat areas on the fixing sleeve are separated from one another by a circumferential web on the outer wall of the fixing sleeve.

14. Component connector according to claim 12, wherein:
a) the respective clamping rings have oppositely directed closing directions due to the oppositely directed profiling of the flat areas.

15. Component connector according to claim 12, wherein:
a) the surface profiling is divided into a number i of congruent segments, each segment encompassing an angular range of 360°/i, and only one wedge face being associated with each segment.

16. Component connector according to claim 11, wherein:
a) the surface profiling is configured in such a way that the clamping rings may be placed on the fixing sleeve in a relative rotation which is free of counterforces.

17. Component connector according to claim 11, wherein:
a) the fixing sleeve and the elastic sleeve are produced as a single component.

* * * * *